Jan. 9, 1968 M. E. WALBERG 3,362,484

FOLDING EXTENSION GANG LOCK

Filed June 9, 1965

Inventor
Maynard E. Walberg
By Kenneth Lackquist
Attorney

United States Patent Office 3,362,484 Patented Jan. 9, 1968

3,362,484

FOLDING EXTENSION GANG LOCK

Maynard E. Walberg, Waukesha, Wis., assignor to Allis-Chalmers Manufacturing Company, Milwaukee, Wis.

Filed June 9, 1965, Ser. No. 462,609
4 Claims. (Cl. 172—568)

ABSTRACT OF THE DISCLOSURE

This invention is an easily operated self-positioning locking mechanism for maintaining two hinged-together portions of an implement in extended aligned relation.

This invention relates generally to agricultural implements and more particularly to implements employing a folding frame construction such as disk harrows or the like.

The advantages of a disk harrow with folding gang extensions are many and well known. For example, a disk harrow with folding gang extensions has the advantage of being able to work a larger area of a field and thereby reduce the time required to complete the field. In addition, when hard ground conditions are encountered, extension gangs may be folded onto the main gang portion, thereby increasing the weight on the remaining ground engaging disks to obtain additional ground pentration. The folding gang construction also permits implements to be transported along highways, through narrow gates, and other restricted areas.

Generally, the prior art devices have accomplished the above objectives; however, they have not provided an entirely satisfactory solution for rigidly locking an extension gang in its extended working position in that the locking mechanism may be overly expensive, it may not be positive in locking and it may be cumbersome to handle.

Accordingly, it is an object of the present invention to provide a simple, relatively inexpensive and easily operated means which will rigidly lock an extension gang in its working position thereby assuring that the ground working disks of the extension gang will penetrate to the same depth as the disks on the main gang section.

Other objects and advantages will appear from the following description considered in conjunction with the attached drawing, in which.

Figure 1:
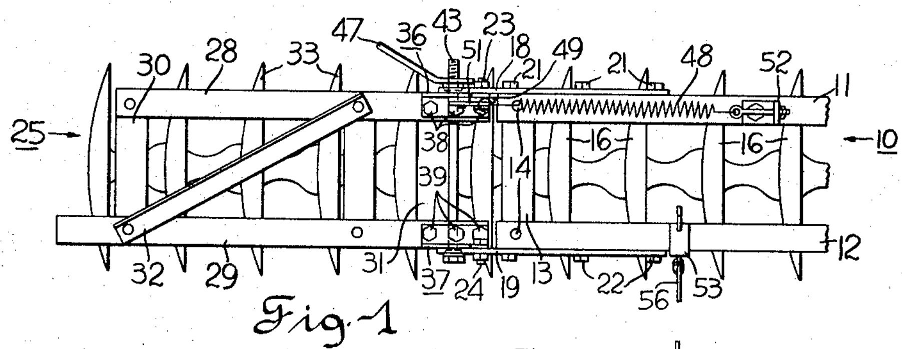
FIG. 1 is a plan view of a portion of a disk harrow including a gang extension and a portion of a main gang.
Figure 2:
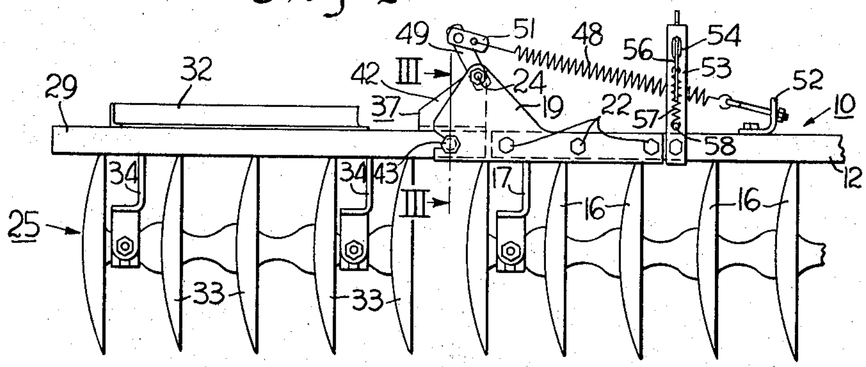
FIG. 2 is a side elevation view similar to FIG. 1.
Figure 4:
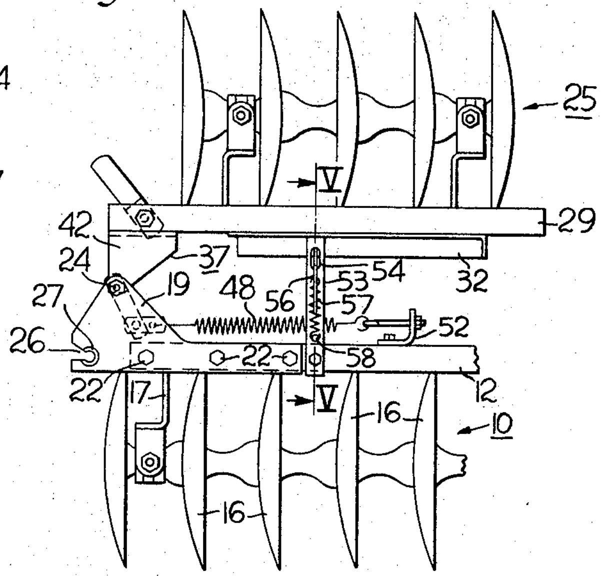
FIG. 4 is a side elevation view similar to FIG. 2 with the extension gang shown in folded position.

Considering FIGS. 1 and 2, it will be seen that the invention is shown as applied, by way of illustration, to one folding gang of a disk harrow such as the type shown and described in U.S. 2,972,385 and U.S. 2,974,738, to which reference may be had should further details of construction be desired. The disk harrow includes a main gang section 10 made up of a pair of longitudinally spaced, transversely extending parallel angle frame members 11 and 12, which are suitably braced by longitudinally extending member 13 (only one of which is shown), which is attached to angle frame members 11 and 12 by means of bolts 14. Disks 16 are rotatably supported from members 11 and 12 by conventional means such as bearing brackets 17 (only one of which is shown). Hinge plates 18 and 19 are rigidly mounted to the outer portions of the main gang frame angles 11 and 12, respectively, by means of bolts 21 and 22, respectively. It is seen that hinge plates 18 and 19 extend to the left and overhang frame members 11 and 12 and these hinge plates also extend upwardly beyond frame members 11 and 12 and are apertured to receive hinge bolts 23 and 24, respectively, which are also pivotally received by a folding gang extension 25. The overhanging ends of hinge plates 18 and 19 are provided with longitudinally aligned open end slots 26 with the slots each being formed with a countersunk circular closed end portion 27 (see FIG. 4). Slots 26 are formed on a radius about the axis of hinge bolts 23 and 24.

Folding gang extension section 25 includes a pair of longitudinally spaced, transversely extending angle members 28 and 29, which as shown in FIG. 1 are in alignment with main gang angle members 11 and 12, respectively. Angle iron members 28 and 29 are suitably braced by longitudinally extending members 30 and 31 and by diagonal brace 32. A series of disk harrow blades 33 are rotatably supported by bearing brackets 34 carried by cross members 30 and 31. A pair of angle shaped hinge plates 36 and 37 (see FIG. 3) have their lower portion attached to the upper surfaces of angle iron members 28 and 29 by means of bolts 38 and 39, respectively. Hinge plates 36 and 37 are provided with upstanding portions 41 and 42, respectively, which are apertured to receive hinge bolts 23 and 24, respectively. It is to be noted that the outer surfaces of portions 41 and 42 are contiguously adjacent to the inner opposed surfaces of the upstanding portions of hinge plates 18 and 19, respectively, so that as will be later explained, frictional engagement between hinge plates 18 and 19 and hinge plates 36 and 37 can be obtained.

Figure 3:
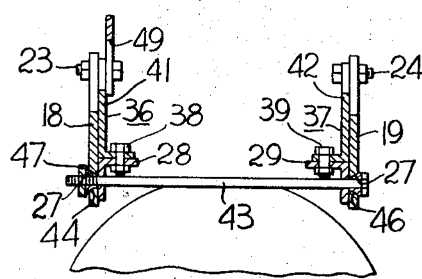
FIG. 3 is a section view taken on line III—III of FIG. 2.

Angle frame members 28 and 29 are provided with openings for receiving a bolt 43, the axis of which bolt is coincidental with the axis passing through the center of closed end portion 27 of hinge plates 18 and 19. A pair of beveled washers 44 and 46 are mounted on bolt 43 and a threaded hand nut 47 is engaged with one end of bolt 43. As shown in FIG. 3 when clamping bolt 43 is tightened, beveled washers 44 and 46 are forced into seats 27 thereby taking up any looseness in the connection and also preventing any relative movement between bolt 43 and slots 26. The hinge plates 18 and 19 and extension gang angle members 28 and 29 are also compressed inwardly thereby increasing the frictional resistance to movement between the hinge sections and to also set up an outwardly reacting force against the bolt 43 to prevent any loosening thereof. The bolt 43, by tying the pivot members together, acts as a truss rod to strengthen the hinge. The beveled washers 44 and 46 are presently shown as individual pieces, however they could be formed as an integral part of the bolt head and hand nut, respectively, to facilitate the loosening of the washers from their beveled seats.

The operation of folding the gang extension 25 is as follows: The hand nut 47 is loosened sufficiently to allow the beveled washers 44 and 46 to be moved outwardly of their counter-sunk openings in hinge plates 18 and 19; the operator then grasps the outboard end of extension gang 25 and raises same which causes the gang to pivot about the axis of hinge bolts 23 and 24 and the shank of bolt 43 to move out of slots 26. Extension 25 can then be pivoted to the folded position shown in FIG. 4.

A counterbalancing spring arrangement 48 is provided to assist in raising extension 25. Hinge plate 36 has an outwardly extending arm 49 rigidly secured thereto, as by welding; this arm is apertured to pivotally receive one end of a link 51 which is pivotally attached at the other end to balance spring 48, the other end of the spring is attached to a bracket 52 carried by frame member 12.

Figure 5:
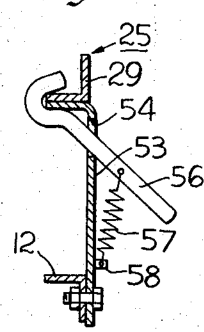
FIG. 5 is a section view taken on line V—V of FIG. 4.

In its raised position, extension 25 rests on a bracket 53 carried by frame member 12. Bracket 53 is provided with a slot 54 therein which receives a latch member 56. A spring 57 is attached at one end to latch member 56 and at the other to a projection 58 on bracket 53 (see FIG. 5). With extension 25 resting on bracket 53, it is an easy matter for the operator to position latch 56 for retaining extension 25 on bracket 53 as shown. The upper portion of latch 56 is larger than the opening in bracket 53 and as spring 57 biases the latch downwardly, there is no danger of the lower end of latch 56 passing through opening 54. Accordingly, it is apparent that a very simple latch mechanism has been provided for retaining extension 25 in its folded position.

To position extension 25 in its extended operating position, the operator grasps the handle or lower portion of latch 56 and moves the handle upwardly causing the latch to pivot about a midportion thereof and thereby freeing the upper portion of the latch from contact with extension 25. This pivotal movement of latch 56 is done against the bias of spring 57. Extension 25 is then pivoted against the bias of spring 48 about the axis of pivot bolts 23 and 24 until the shank of bolt 43 enters slots 26 and becomes positioned in countersunk center portions 27. Hand nut 47 is then tightened, driving beveled washers 44 and 46 into the conical seats in countersunk center portion 27 and such tightening process is continued until extension 25 has been made rigid with main section 10.

From the foregoing it is seen how a relatively simple and inexpensive fastening means has been provided for rigidly securing a folding gang extension to a main frame and how easily an extension gang can be moved from an extended position to a folded position.

The embodiments of the invention for which an exclusive property or privilege is claimed are defined as follows:

1. In a folding implement frame having two sections pivotally connected; an arrangement to releasably lock said sections in a selected working position, comprising a first pair of hinge members carried by one of said sections, a second pair of hinge members carried by the other of said sections, said first and second pair of hinge members being pivotally connected for relative vertical pivotal movement of said sections; said one section supporting a longitudinally extending adjustable member positioned in spaced relation to the pivotal connection between said hinges, said second pair of hinge members being provided with spaced openings therein positioned the same distance from said pivotal connection as said adjustable member for receiving said adjustable member during relative pivotal movement of said sections, said adjustable member comprising means fixed with and movable transversely of said one section and being adapted to clamp said sections rigidly in transverse alignment when said adjustable member is positioned in said openings.

2. A folding implement as recited in claim 1 including means carried by one of said sections for releasably retaining said sections in nonaligned relation when said adjustable member is free of said openings.

3. A folding implement as recited in claim 1 and wherein said adjustable member comprises an elongated bolt received within said spaced openings in said one section and having inwardly facing conical portions adapted to be seated on complementary surfaces provided about said openings in said other section, and means for tightening said bolt for moving said conical portions inwardly against said complementary surface for locking said sections against pivotal movement.

4. A folding implement as recited in claim 3 and wherein said openings are provided with slots leading thereto for guiding the shank of said bolt into and out of said openings during said relative pivotal movement of said sections.

References Cited

UNITED STATES PATENTS

| | | | |
|---|---|---|---|
| 2,306,127 | 12/1942 | Johnston et al. | 172—568 |
| 2,974,738 | 3/1961 | Walberg | 172—568 |
| 868,559 | 10/1907 | Heitzenrater | 16—144 |
| 2,878,510 | 3/1959 | Burke | 16—144 |
| 3,123,153 | 3/1964 | Morkoski et al. | 172—640 |

ABRAHAM G. STONE, *Primary Examiner*.

R. C. CARTER, A. E. KOPECKI, *Assistant Examiners*.